March 15, 1960    M. DAVIS    2,928,567
UTENSIL
Filed Dec. 10, 1957
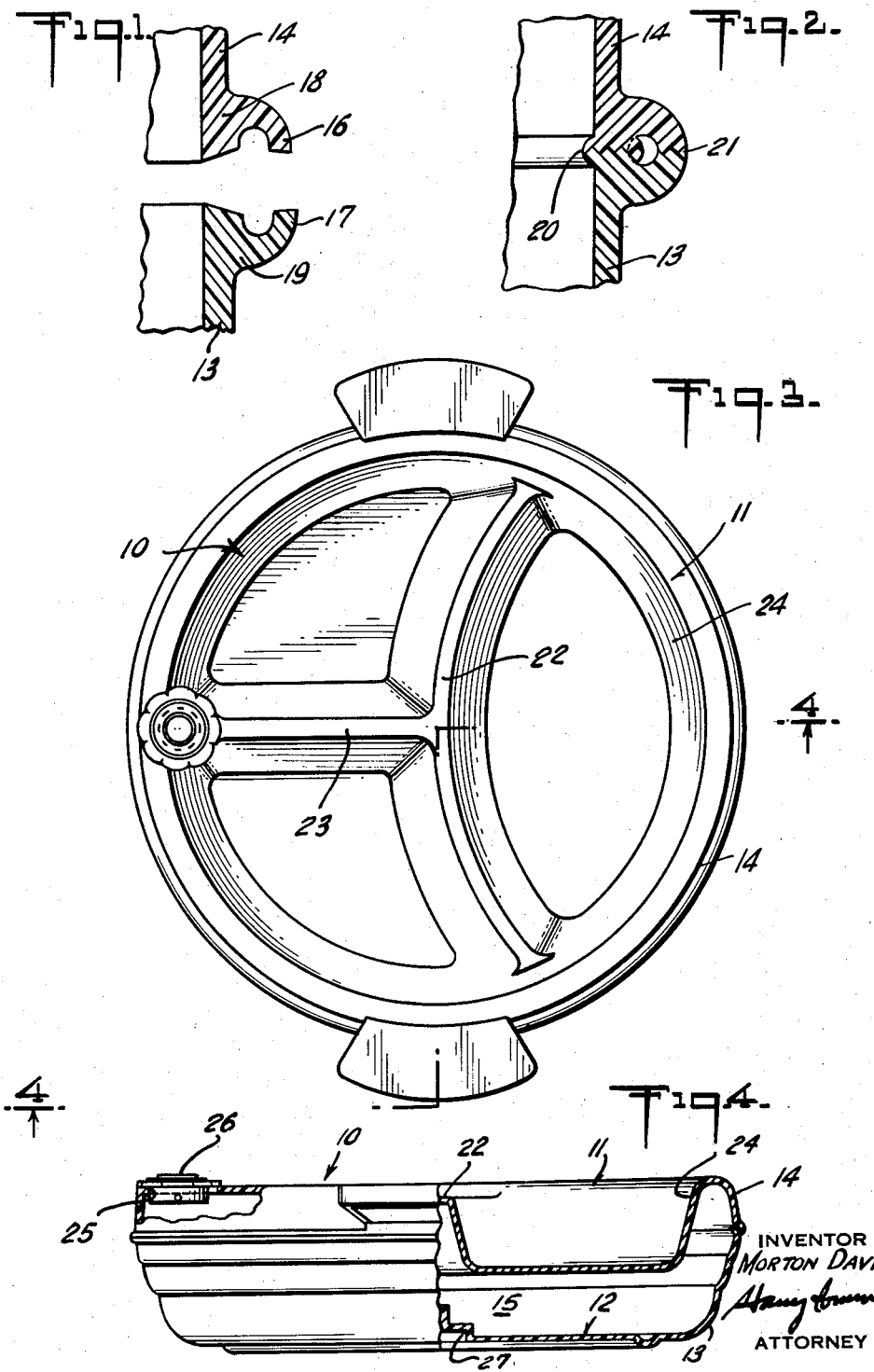
INVENTOR
MORTON DAVIS
ATTORNEY

United States Patent Office 2,928,567
Patented Mar. 15, 1960

2,928,567
UTENSIL

Morton Davis, South Orange, N.J., assignor to Joseph Davis Plastics Co., North Arlington, N.J., a corporation of New Jersey Application December 10, 1957, Serial No. 701,871

1 Claim. (Cl. 220—13)

This invention relates to utensils, and more particularly to a utensil so constructed as to define flat upper and lower sections having marginal ribs directed toward each other, the abutting edges of said ribs being united under heat and pressure to provide a unitary smooth outer finish and an internal bead at said point of abutment, maintaining the sections so assembled as a sealed unit defining an internal fluid tight compartment.

Pursuant to the preferred form of invention, the upper and lower section ribs are provided with fingers extending from the free ends of said ribs and defining, with said ribs h shaped portions opening toward each other. The h shaped portions, when heated and brought together under pressure, homogeneously unite the sections marginally and define a fluid tight seal for said compartment. By the construction above described and disclosed herein, a utensil is provided having an internal fluid compartment which is marginally sealed unitarily without the use of cement, in a highly efficient and sanitary fashion, enabling the device to be sterilized in boiling water without distortion or damage thereto.

Examples of practical devices embodying the invention are described below and in the accompanying drawings; the invention is not limited thereto, but covers all other forms coming within the scope or purview of the disclosure herein.

In the drawings:

Fig. 1 is a fragmentary, sectional view of the abutting portions of the marginal ribs of the upper and lower sections of the utensil, prior to their being heated and brought together under pressure, Fig. 2 is a similar view thereof, after being heated and brought together under pressure, showing the material of said ribs homogeneously united and defining a unitary internal weld and external smooth finish at the prior point of abutment of the upper and lower sections, Fig. 3 is a top plan view of one form of the utensil embodying the invention, and Fig. 4 is a vertical, fragmentary, sectional view taken at line 4—4 of Fig. 3.

In the drawings, a utensil embodying the invention is shown to comprise a dish 10 formed with a hollow internal fluid compartment (15, Fig. 2) to contain hot liquid for maintaining food placed on the dish hot, said dish comprising assembled upper and lower sections 11, 12 with mating edge portions of thermoplastic material integrally united to define said internal compartment, said edge portions of the perimeter 14, 15 of each section being preformed bifurcated as noted at 18, 19, Fig. 1, to provide radially spaced inner and outer concentric edges, each outer edge 16, 17 initially terminating short of the plane of the inner edge of the carrying section, the edges of the sections being heat sealed together with the inner edges deformed and providing a bead 20 interiorly of the dish and one concealed in the space between said inner and outer edges (Fig. 2) while the outer edges will unite with a smooth finish at the line 21 of section engagement on the outer surface of said dish.

The upper section may be provided with a plurality of ribs 22, 23 and with a marginal wall defining a plurality of upwardly opening food-receiving portions in the upper section 11. The utensil may be provided with an opening 25 to the fluid compartment 15 provided with a quick opening and closing plug 26 threaded thereinto, or having a bayonet slot or other type of engagement therewith. The utensil may be sterilized in boiling water without distortion. A recess 27 (Fig. 4) may be built into the bottom section to permit attaching a suction cup to prevent the utensil from sliding while in use. The utensil is substantially indestructible in use and requires the use of no adhesive or cement to join the sections.

Having thus described my invention, what I claim as new and desire to secure by Letters Patent is:

A dish formed with a hollow internal fluid compartment to contain hot liquid for maintaining food placed on the dish hot, said dish comprising assembled upper and lower sections with mating edge portions of thermoplastic material integrally united to define said internal compartment, said edge portions of each section being preformed bifurcated to provide radially spaced inner and outer concentric edges, each outer edge initially terminating short of the plane of the inner edge of the carrying section, the edges of the sections being heat sealed together with the inner edges deformed and providing a bead interiorly of the dish and one concealed in the space between said inner and outer edges, while the outer edges will unite with a smooth finish at the line of section engagement on the outer surface of said dish.

References Cited in the file of this patent

UNITED STATES PATENTS

| | | |
|---|---|---|
| 643,787 | Brochu | Feb. 20, 1900 |
| 2,219,576 | Moreland | Oct. 29, 1940 |
| 2,438,546 | Davis | Mar. 30, 1948 |
| 2,744,655 | Vnuk | May 8, 1956 |
| 2,795,348 | Kunik | June 11, 1957 |

FOREIGN PATENTS

| | | |
|---|---|---|
| 1,022,124 | France | Dec. 10, 1952 |